(12) United States Patent
Jia et al.

(10) Patent No.: US 10,593,291 B2
(45) Date of Patent: Mar. 17, 2020

(54) METHODS FOR COLOR SENSING AMBIENT LIGHT SENSOR CALIBRATION

(71) Applicant: Apple Inc., Cupertino, CA (US)

(72) Inventors: Zhang Jia, Santa Clara, CA (US); Amy M. Winkler, Cupertino, CA (US); Christopher S. Erickson, San Jose, CA (US); Zhen Zhang, San Jose, CA (US); David W. Ritter, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1015 days.

(21) Appl. No.: 14/857,321

(22) Filed: Sep. 17, 2015

(65) Prior Publication Data
US 2017/0084250 A1 Mar. 23, 2017

(51) Int. Cl.
G09G 5/02 (2006.01)
G09G 5/06 (2006.01)
(Continued)

(52) U.S. Cl.
CPC .............. G09G 5/06 (2013.01); G01J 3/0251 (2013.01); G01J 3/0297 (2013.01); G01J 3/10 (2013.01);
(Continued)

(58) Field of Classification Search
CPC .............. G09G 5/06; G09G 2320/0242; G09G 2360/144; G09G 3/3406; G09G 3/3413; G09G 5/02; G09G 2320/02285; G09G 2320/06; G09G 2320/0666; G09G 2320/0693; G09G 2340/06; G01J 3/50;
(Continued)

(56) References Cited

U.S. PATENT DOCUMENTS 8,638,340 B2 1/2014 Holub
8,803,096 B2 8/2014 Holcombe et al.
(Continued)

OTHER PUBLICATIONS

"Introducing the All New Fire HDX—Higher Performance, Exclusive New Audio, the Fastest WiFi, and Still Startlingly Light with a Stunning HDX Display", Amazon Media Room: Press Release, [Retrieved on Dec. 8, 2015], Retrieved from Internet<URL: http://phx.corporateir.net/phoenix.zhtml?c=176060&p=irolnewsArticle_pf&ID=1969157>.

(Continued)

Primary Examiner — Michael J Eurice
(74) Attorney, Agent, or Firm — Treyz Law Group, P.C.; G. Victor Treyz; Kendall W. Abbasi

(57) ABSTRACT

An electronic device may be provided with a color sensing ambient light sensor. The color sensing ambient light sensor may measure the color of ambient light. Control circuitry in the electronic device may use information from the color sensing ambient light sensor in adjusting a display in the electronic device or taking other action. The color sensing ambient light sensor may have light detectors with different spectral responses. A test system may be used to calibrate the color sensing light sensor. The test system may have a tunable light source with light-emitting diodes that are turned on in sequence while gathering measured responses from the detectors. Numerical optimization techniques may be used to produce final versions of the spectral responses for the light detectors from the measured responses and corresponding calibration data that is stored in the electronic device.

21 Claims, 8 Drawing Sheets

(51) Int. Cl.
  *G09G 3/34* (2006.01)
  *G01J 3/50* (2006.01)
  *G01J 3/02* (2006.01)
  *G01J 3/52* (2006.01)
  *G01J 3/10* (2006.01)
  *G01J 3/46* (2006.01)
  *G01J 3/51* (2006.01)

(52) U.S. Cl.
  CPC ............... *G01J 3/465* (2013.01); *G01J 3/50* (2013.01); *G01J 3/505* (2013.01); *G01J 3/513* (2013.01); *G01J 3/524* (2013.01); *G01J 2003/104* (2013.01); *G01J 2003/106* (2013.01); *G09G 2320/0242* (2013.01); *G09G 2320/0285* (2013.01); *G09G 2320/0666* (2013.01); *G09G 2320/0693* (2013.01); *G09G 2360/144* (2013.01)

(58) Field of Classification Search
  CPC .......... G01J 3/0297; G01J 1/32; G01J 1/4204; G01J 1/4228; G01J 3/10; G01J 3/0251; G01J 3/36; G01J 3/463; G01J 3/465; G01J 3/501; G01J 3/505; G01J 3/513; G01J 3/524; G01J 2003/104; G01J 2003/106; G01J 2003/467; H04N 9/3194
  See application file for complete search history.

(56) References Cited

U.S. PATENT DOCUMENTS

| | | | | |
|---|---|---|---|---|
| 2002/0001080 A1* | 1/2002 | Miller | ............... | G01J 1/08 356/326 |
| 2002/0015043 A1* | 2/2002 | Matsuda | ............... | G09G 5/00 345/596 |
| 2005/0083293 A1* | 4/2005 | Dixon | ............... | G09G 3/3413 345/102 |
| 2006/0013479 A1* | 1/2006 | Trimeche | ............... | H04N 9/045 382/167 |
| 2006/0082776 A1* | 4/2006 | Lianza | ............... | G01J 3/02 356/419 |
| 2006/0218172 A1* | 9/2006 | Mestha | ............... | G01J 3/02 |
| 2008/0303918 A1* | 12/2008 | Keithley | ............... | G09G 3/20 348/223.1 |
| 2010/0188418 A1* | 7/2010 | Sakai | ............... | G01J 1/4204 345/594 |
| 2010/0194288 A1* | 8/2010 | Norgaard | ............... | G01J 1/32 315/149 |
| 2010/0289835 A1* | 11/2010 | Holub | ............... | G01J 3/02 345/690 |
| 2011/0199350 A1* | 8/2011 | Wilson | ............... | G09G 5/02 345/207 |
| 2011/0248170 A1* | 10/2011 | Holcombe | ............... | G01S 3/7803 250/340 |
| 2012/0050307 A1* | 3/2012 | Mahowald | ............... | H05B 37/0218 345/590 |
| 2012/0129269 A1* | 5/2012 | Choi | ............... | A61B 5/0075 436/164 |
| 2012/0262571 A1* | 10/2012 | Wang | ............... | H04N 5/2354 348/135 |
| 2012/0327405 A1* | 12/2012 | Ebihara | ............... | G01J 3/0291 356/300 |
| 2013/0069924 A1* | 3/2013 | Robinson | ............... | G09G 3/20 345/207 |
| 2013/0076712 A1* | 3/2013 | Zheng | ............... | G01J 1/32 345/207 |
| 2013/0222408 A1* | 8/2013 | Lee | ............... | G09G 3/3466 345/589 |
| 2013/0307419 A1* | 11/2013 | Simonian | ............... | H05B 33/0872 315/153 |
| 2014/0085265 A1* | 3/2014 | Yin | ............... | G06F 1/1637 345/175 |
| 2014/0198084 A1* | 7/2014 | Peana | ............... | G09G 3/3406 345/207 |
| 2014/0210802 A1* | 7/2014 | Myers | ............... | G09G 3/3413 345/207 |
| 2015/0046505 A1* | 2/2015 | Sun | ............... | G09G 5/00 708/202 |
| 2015/0070337 A1* | 3/2015 | Bell | ............... | G09G 3/2003 345/207 |
| 2015/0092186 A1* | 4/2015 | Wieser | ............... | G01J 1/4204 356/43 |
| 2016/0005362 A1* | 1/2016 | Chen | ............... | G09G 3/3406 345/690 |
| 2016/0187652 A1* | 6/2016 | Fujimaki | ............... | G02B 27/0172 345/8 |
| 2016/0203749 A1* | 7/2016 | Steyskal | ............... | G09G 3/3406 345/207 |
| 2016/0245695 A1* | 8/2016 | Lee | ............... | G01J 3/513 |

OTHER PUBLICATIONS

"Galaxy S5 Explained: the Display", Samsung Newsroom, Apr. 23, 2014, [Retrieved on Dec. 8, 2015], Retrieved from Internet<URL:http://news.samsung.com/global/galaxys5explainedthedisplay>.

* cited by examiner

METHODS FOR COLOR SENSING AMBIENT LIGHT SENSOR CALIBRATION

BACKGROUND

This relates generally to electronic devices, and, more particularly, to light sensors for electronic devices.

Electronic devices such as laptop computers, cellular telephones, and other equipment are sometimes provided with light sensors. For example, ambient light sensors may be incorporated into a device to provide the device with information on current lighting conditions. Ambient light readings may be used in controlling the device. If, for example, bright daylight conditions are detected, an electronic device may increase display brightness to compensate.

Ambient light conditions sometimes include significant changes in color. For example, an electronic device may be used in a cool color temperature environment such as outdoors shade or a warm color temperature environment such as an indoors environment that has been lit with incandescent lighting. Content that appears to be correctly displayed on a display in one of these environments may have an unpleasant color cast in the other environment. For example, a display that is properly adjusted in an outdoors environment may appear overly cool under incandescent lighting.

It would be desirable to be able to accurately improve the presentation of color images or to take other suitable actions based on ambient lighting attributes such as ambient light color information.

SUMMARY

An electronic device may be provided with a color sensing ambient light sensor. The color sensing ambient light sensor may measure the color of ambient light. Control circuitry in the electronic device may use information from the color sensing ambient light sensor in adjusting a display in the electronic device and in taking other actions.

The color sensing ambient light sensor may have light detectors with different spectral responses. A test system may be used to calibrate the color sensing ambient light sensor. The test system may have a tunable light source with light-emitting diodes. Control circuitry in the test system may turn on each of the light-emitting diodes in sequence while gathering measured responses from the detectors.

Numerical optimization techniques such as pseudo inverse techniques, filtering techniques, and other techniques may be used to produce final versions of the spectral responses for the light detectors from the measured responses. Using the final versions of the detector spectral responses, the test system may produce and store corresponding color sensing ambient light sensor calibration data in the electronic device.

DETAILED DESCRIPTION

An electronic device may be provided with a color sensing light sensor. The color sensing light sensor may serve as an ambient light sensor in a portable electronic device such as a cellular telephone, tablet computer, laptop computer, wristwatch device, or other electronic equipment. During manufacturing, a test and calibration system may be used to calibrate the color sensing ambient light sensor. A tunable light source in the test system may be used to supply light of different colors to the ambient light sensor while ambient light sensor response data is gathered. The tunable light source may be based on an array of light-emitting diodes of different colors or other suitable tunable light source. The ambient light sensor may have multiple channels each of which senses ambient light with a different spectral response. For example, the ambient light sensor may have 4-10 light detectors or other suitable number of detectors each of which is configured to measure a different portion of the light spectrum (i.e., each light detector has a different spectral response and therefore is sensitive to a different color of light).

To calibrate the channels of the ambient light sensor, the tunable light source serves as a reference light source and generates test light over a range of wavelengths. While illuminated with the test light, the response of each of the different color channels of the color sensing ambient light source may be measured. The results of this characterization process may be analyzed to determine the spectral response of each channel. Calibration data for an electronic device that has been tested in this way may be stored in the device, so that the device and color sensing ambient light sensor of that device will perform accurately during normal use.

Figure 1:
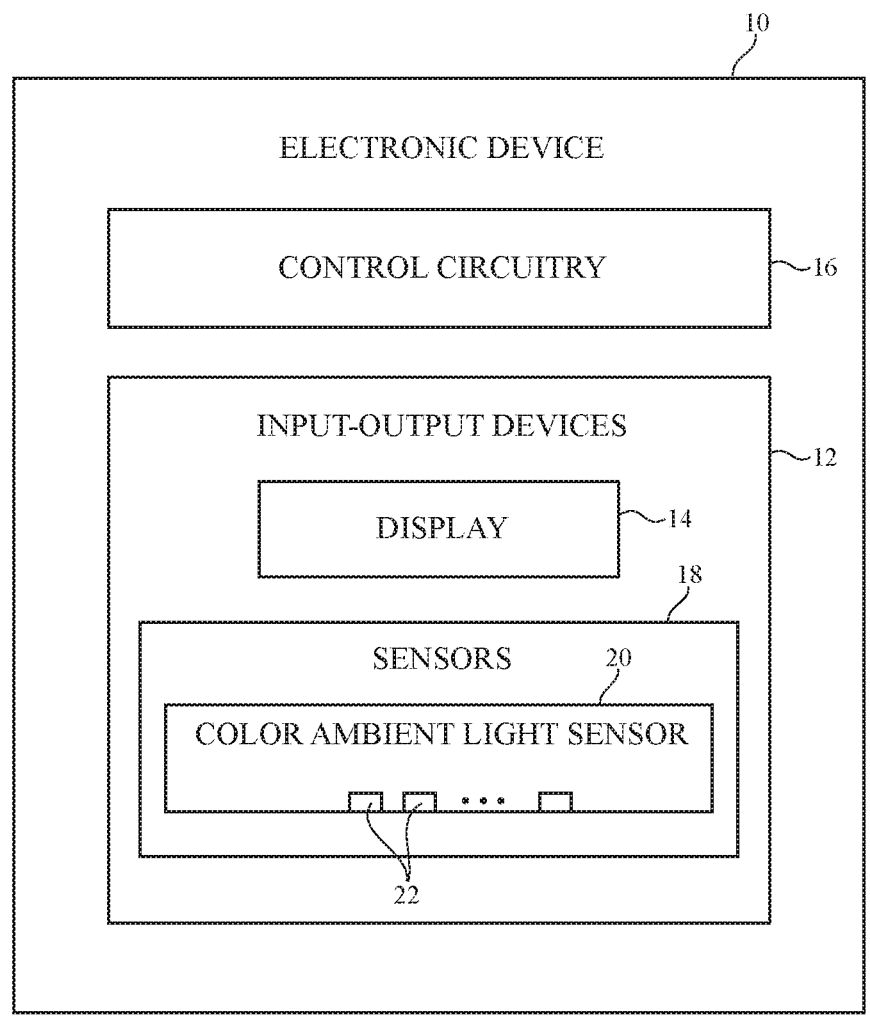
FIG. 1 is a schematic diagram of an illustrative electronic device having a color sensing ambient light sensor in accordance with an embodiment.

An illustrative electronic device of the type that may be provided with a color sensing ambient light sensor is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. Display 14 may be an organic light-emitting diode display or other light-emitting diode display, a liquid crystal display, a plasma display, an electrowetting display, an electrophoretic display, or other suitable display.

Input-output devices 12 may include sensors 18. Sensors 18 may include an ambient light sensor such as color sensing ambient light sensor 20 and other sensors (e.g., a capacitive proximity sensor, a light-based proximity sensor, a magnetic sensor, an accelerometer, a force sensor, a touch sensor, a temperature sensor, a pressure sensor, a compass, a microphone or other sound sensor, or other sensors).

Color sensing ambient light sensor 20 may have an array of light detectors 22 each of which is provided with a different respective color filter. Each detector 22 may include a photosensitive semiconductor device such as a photodiode or phototransistor and may produce an independent channel of light sensor data. The color filter of each detector may provide that detector with a unique light sensitivity spectrum. For example, data for a red channel in color sensing ambient light sensor 20 may be gathered by one of detectors 22 that is covered with a red color filter to provide that detector with a light sensing spectrum that peaks at a red wavelength. There may be any suitable number of detectors 22 in color sensing ambient light sensor (e.g., 3-10, 5 or more, 6 or more, 7 or more, fewer than 8, fewer than 20, 2-15, 5-20, or other suitable number).

Information from detectors 22 may be used to measure the total amount of ambient light that is present in the vicinity of device 10. For example, the ambient light sensor may be used to determine whether device 10 is in a dark or bright environment. Based on this information, control circuitry 16 can adjust display brightness for display 14 or can take other suitable action.

The array of colored detectors 22 may also be used to make color measurements. Color measurements may be gathered as color coordinates, color temperature, or correlated color temperature. Processing circuitry may be used to convert these different types of color information to other formats, if desired (e.g., a set of color coordinates may be processed to produce an associated correlated color temperature, etc.).

Color information from color sensing ambient light sensor 20 (and/or brightness information) can be used to adjust the operation of device 10. For example, the color cast of display 14 may be adjusted in accordance with the color of ambient lighting conditions. If, for example, a user moves device 10 from a cool lighting environment to a warm lighting environment (e.g., an incandescent light environment), the warmth of display 14 may be increased accordingly, so that the user of device 10 does not perceive display 14 as being overly cold. If desired, the ambient light sensor may include an infrared light sensor. In general, any suitable actions may be taken based on color measurements and/or total light intensity measurements (e.g., adjusting display brightness, adjusting display content, changing audio and/or video settings, adjusting sensor measurements from other sensors, adjusting which on-screen options are presented to a user of device 10, adjusting wireless circuitry settings, etc.).

Manufacturing variations may cause the spectral responses of detectors 22 to vary slightly from device to device. To compensate for these manufacturing variations, devices 10 may be calibrated. Following fabrication of device 10 and sensor 20, device 10 (sometimes referred to as a device under test) may be tested using a test and calibration system of the type shown in FIG. 2. Test results may be analyzed by the test system to determine the response of sensor 20 and this information may be stored in device 10 to calibrate device 10.

Test system 30 may include a source of test light 40 such as tunable light source 32. Tunable light source 32 may be an integrating sphere with an associated set of light-emitting diodes 34 or other suitable source of adjustable wavelength test light 40. In a configuration for light source 32 that is based on a set of light-emitting diodes 34, each light-emitting diode 34 may have a different output light spectrum. Control circuitry 36 may control the operation of light-emitting diodes 34 to tune the wavelength of test light 40. For example, control circuitry 36 may turn on a given one of light-emitting diodes 34 while turning off all remaining light-emitting diodes. By stepping through each light-emitting diode 34 in sequence this way while using control circuitry 36 to gather information from device 10 on the resulting response of the detectors 22 in light sensor 20, light sensor 20 may be tested over a range of wavelengths. Control circuitry 36 can compute the response spectrum for each detector 22 based on the measured response of each detector 22 to each of the light-emitting diodes 34. Corresponding calibration data may then be stored in device 10 to calibrate device 10. During normal operation, device 10 will apply the calibration data to light measurements made with sensor 20 to enhance the accuracy of those measurements. The calibration data may include the spectral responses or a compressed version of the spectral response curves (as examples).

Test light 40 may span any suitable range of wavelengths. As an example, test light 40 may range from 300 nm (ultraviolet light) to 1100 nm (infrared light). This range of wavelengths encompasses the visible light range of 390-700 nm and infrared wavelengths where light sensor 20 may optionally be sensitive. Other wavelength ranges may be used to test color sensing ambient light sensor 20 or other photosensitive devices (e.g., cameras, etc.) if desired. For example, calibration operations may be performed over a visible wavelength range (e.g., 400-700 nm), in which case fewer light-emitting diodes 34 may be used in light source 32 than when performing calibrations over a wider wavelength range. The use of a wavelength range of 300 nm to 1100 nm for test light 40 may sometimes be described herein as an example. There may be any suitable number of light-emitting diodes 34 in light source 32. For example, the number N of light-emitting diodes 34 may be 30, 36, 40, 42, 20-40, 10-50, 30-50, 25-60, more than 30, more than 35, more than 40, less than 70, less than 60, less than 50, less than 40, or other suitable number.

Figure 2:
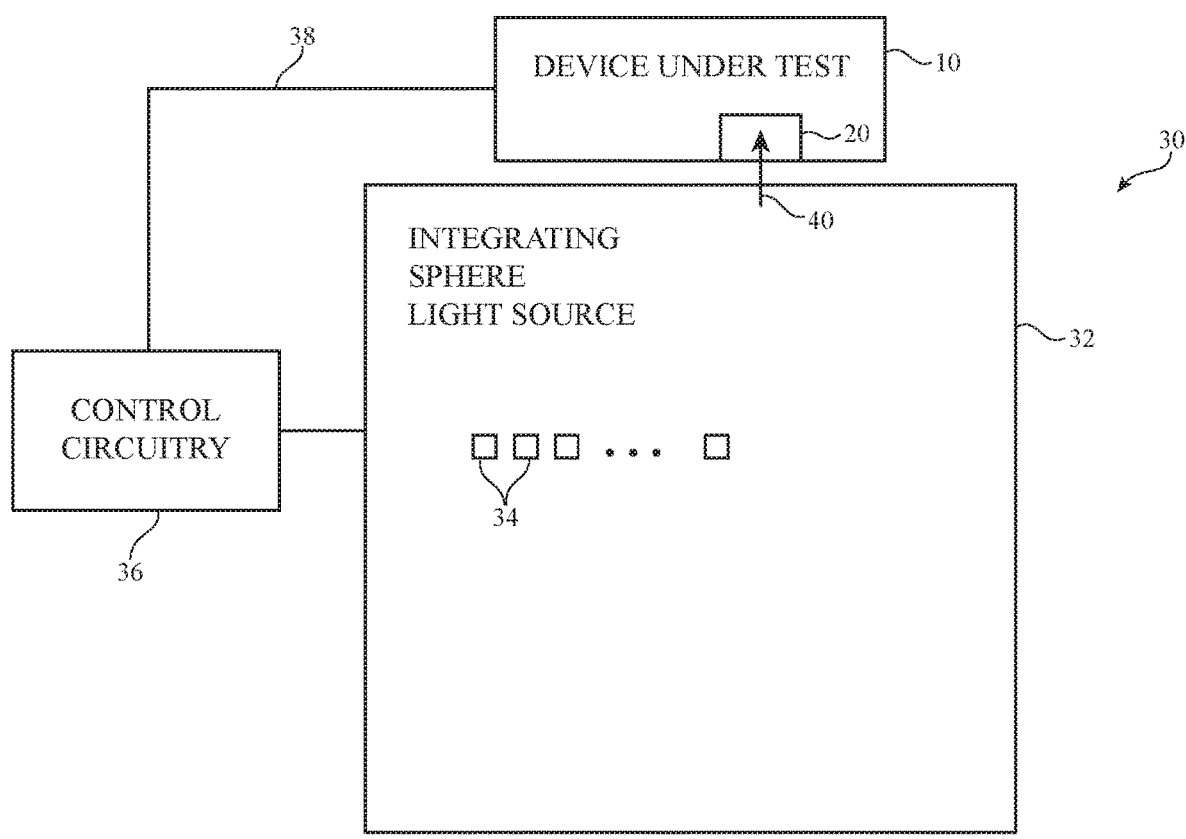
FIG. 2 is a diagram of an illustrative test system for calibrating an electronic device with a color sensing ambient light sensor in accordance with an embodiment.
Figure 3:
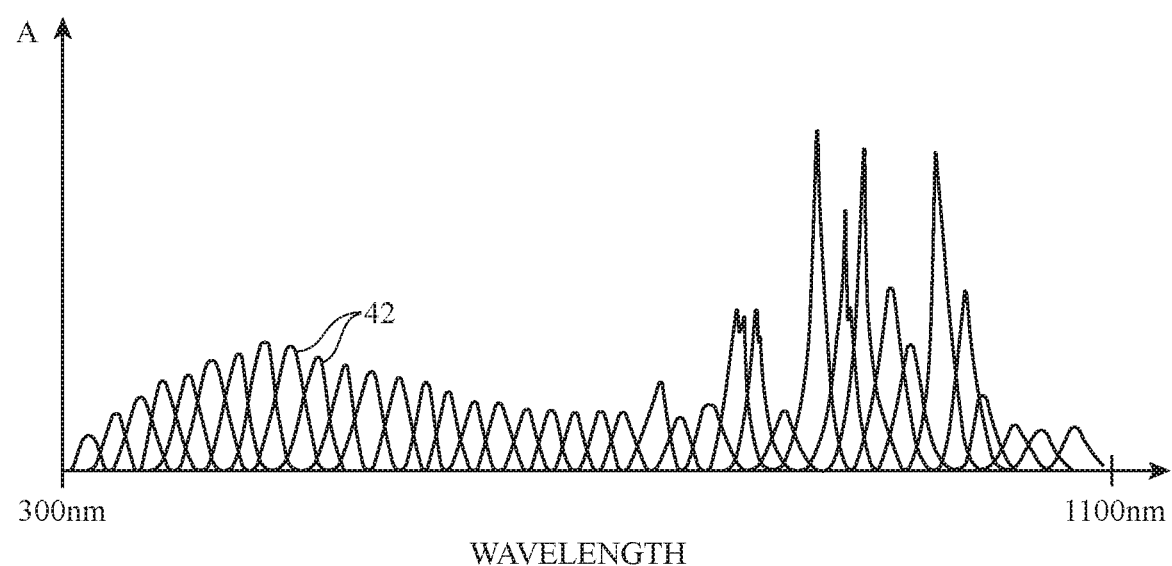
FIG. 3 is a graph showing light spectra associated with a tunable light source in the test system of FIG. 2 in accordance with an embodiment.

FIG. 3 is a graph in which an illustrative output spectrum of light source 32 has been plotted as a function of wavelength in a range of 300 nm to 1100 nm. Each of output peaks 42 corresponds to the light spectrum of a corresponding light-emitting diode 34. Fewer light-emitting diodes 34 may be used in light source 32 of test system 30 of FIG. 2 or more light-emitting diodes 34 may be used in light source 32. The configuration of FIG. 3 is merely illustrative.

Optimization techniques based on matrix algebra may be used to solve for the spectral responses of detectors 22. The relationship between the spectral response of the different color channels under test, the output spectra of light-emitting diodes 34 in tunable light source 32, and the response of each of detectors 22 can be represented equation 1.

$$b = Ax \quad (1)$$

In equation 1, A is a matrix representing output light 40 (see, e.g., FIG. 3). Matrix A may be, for example, an m×n matrix. The value of m may correspond to the number of light-emitting diodes 32 in light source 32. As an example, m may be 40. The value of n may correspond to a desired number of wavelength steps between 300 nm and 1100 nm. As an example, n may be 400. Matrix A may therefore have 40 rows each of which corresponds to a different light-emitting diode 34 in source 32 and 400 columns. The entries in the columns correspond to the output intensity of each light-emitting diode at a different respective wavelength between 300 nm to 1100 nm.

Variable x of equation 1 is the unknown spectral response of a given detector 22 (i.e., the spectral response of each of detectors 22 of sensor 20 in device under test 10 may be represented by a corresponding array x). Array x may be an n×1 array (i.e., a 400×1 array in the present example where wavelength is divided into 400 steps). Each detector 22 has a corresponding array x that characterizes its sensitivity spectrum. Each entry in array x corresponds to the sensitivity of detector 22 at a respective wavelength value between 300 nm and 1100 nm.

Parameter b in equation 1 is an m×1 matrix (i.e., a 40×1 array in the current example). Each entry in array b corresponds to the output of detector 22 to a respective one of the 40 light-emitting diodes 34 in light source 32.

The values of matrix A may be obtained by characterizing light-emitting diodes 34 with a calibrated spectrometer. The values of b for a given detector 22 in sensor 20 may be obtained by measuring the output of that detector 22 to each of light-emitting diodes 34 in sequence (i.e., by gathering a measured response for that detector 22 using the light-emitting diodes of different wavelengths as a stimulus). This process may then be repeated for each detector 22. Using this data, the spectral response x for each detector 22 may be determined by solving equation 2.

$$x = A^{-1}b \quad (2)$$

Figure 4:
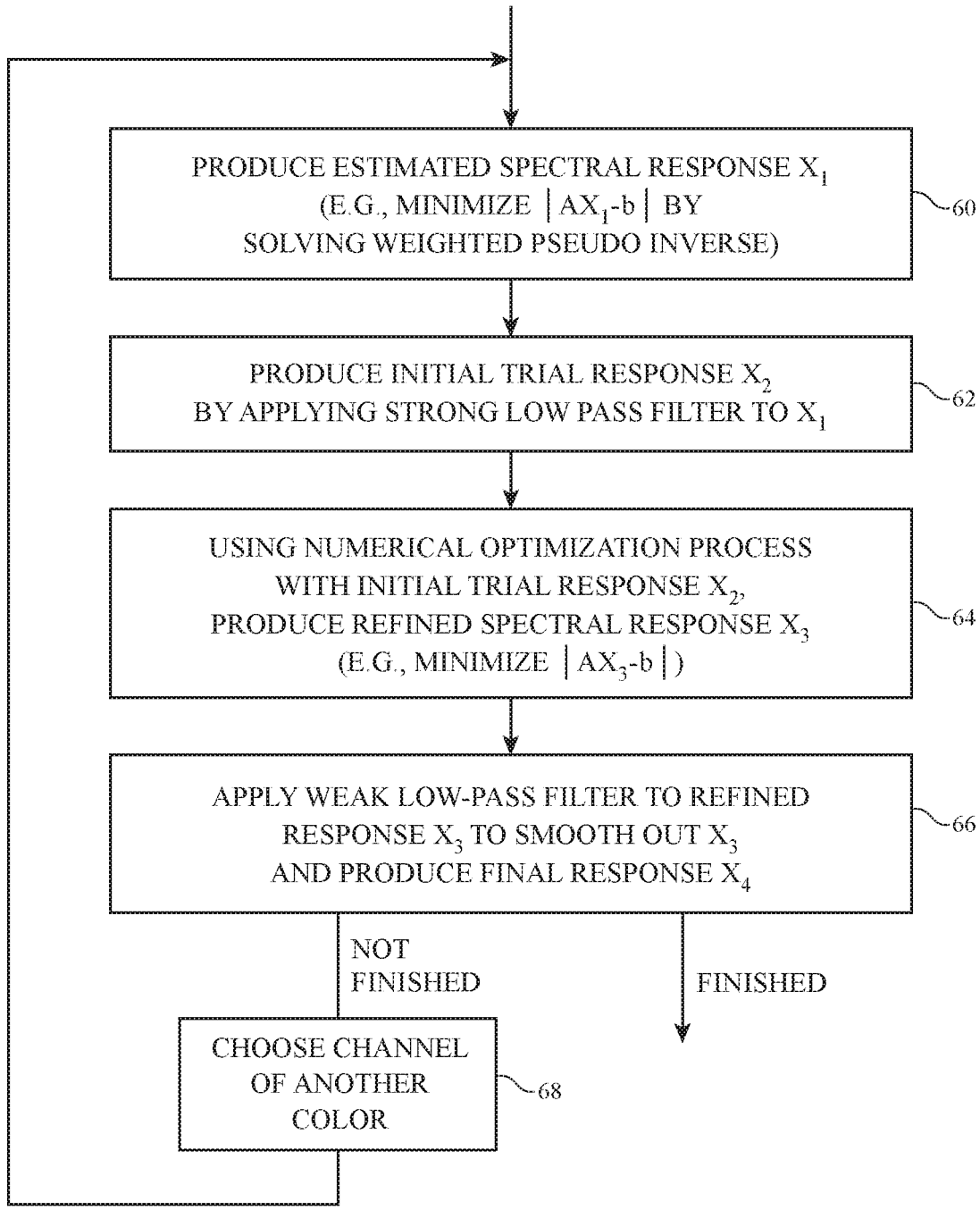
FIG. 4 is a flow chart of illustrative steps involved in applying numerical optimization processes to light detector data to allow calibration of a light sensor in accordance with an embodiment.

A flow chart of illustrative steps involved in solving for unknown response spectra x is shown in FIG. 4. These operations may be performed by control circuitry 36 (FIG. 2). Processing circuitry 36 may be co-located with light source 32 or may be remote from light source 32 and may include one or more processors (computers) or other processing circuitry. The numerical method of FIG. 4 involves making an initial guess of the spectral response followed by an interactive process to refine the spectral response guess to an accurate final result that satisfies a figure of merit (e.g., minimization techniques, making a derivative equal to zero by comparing and filtering intermediate results, etc.). In general, any suitable numerical methods may be used to obtain the results obtained in FIG. 4. The operations of FIG. 4 are merely illustrative.

Figure 5:
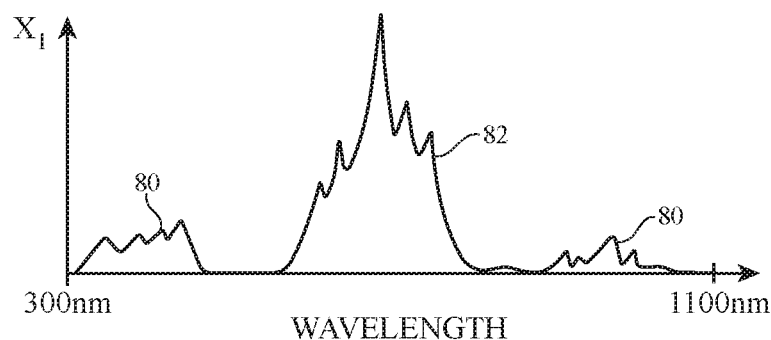
FIGS. 5, 6, 7, and 8 are graphs showing how measured spectral response data can be processed to produce final spectral response curves for detectors in an ambient light sensor in accordance with an embodiment.

At step 60, control circuitry 36 may produce an initial estimate for x (called $x_1$). Control circuitry 36 may use a weighted pseudo inverse technique or other optimization technique (e.g., an interpolation technique in which raw measurements are interpolated, retrieval and use of a known average from previous true measurements, etc.) to minimize the value of $|Ax_1 - b|$, where $x_1$ is a desired initial (rough) estimate for x. The full-width-half-maximum spectral width of each of light-emitting diodes 34 may be about 10-30 nm, more than 10 nm, less than 30 nm, or other spectral width. The spectra of light-emitting diodes 34 preferably overlap one another, as shown in FIG. 3. This helps ensure that the pseudo inverse technique will produce a satisfactory estimate for $x_1$. If desired, the output comparable to the output of an array of light-emitting diodes may 34 be produced using a continuous wavelength source filtered through one or more filters or through an adjustable filter (e.g., a monochromater with a grating, a prism, etc.). The value of $x_1$ may appear as shown in FIG. 5. As shown in FIG. 5, artifacts such as artifacts 80 may be present on one or both sides of central response peak 82 in $x_1$ due to the approximate nature of the pseudo inverse technique.

Figure 6:
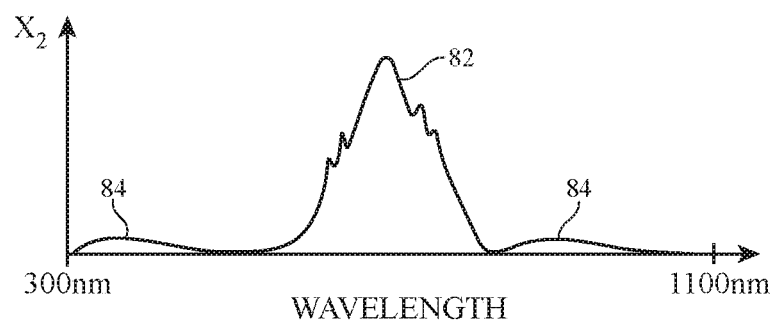

At step 62, a low pass filter such as a strong low pass filter may be applied to rough estimate $x_1$ to produce an initial trial value for spectral response x (called $x_2$). As shown in FIG. 6, artifacts 80 may be smoothed, but may not yet be completely eliminated.

Figure 7:
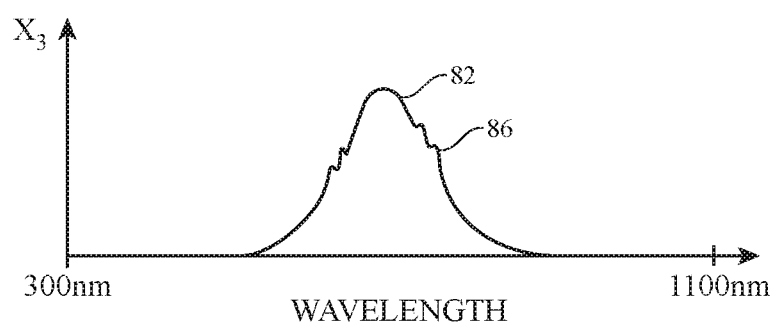

At step 64, initial trail response $x_2$ (which may be overly smoothed due to the use of the strong low pass filter) may be supplied as an input to a numerical optimization process (i.e., a process that minimizes $|Ax_3 - b|$ such as an iterative deconvolution process, a limited-memory BFGS process—i.e., a process using the Broyden-Fletcher-Goldfarb-Shanno algorithm, or other suitable numerical optimization process). The output of the numerical optimization process is refined spectral response $x_3$. As shown in FIG. 7, the numerical optimization process may remove erroneous data such as smoothed artifacts 84 of FIG. 6, but some noise 86 may remain in the response spectrum.

Figure 8:
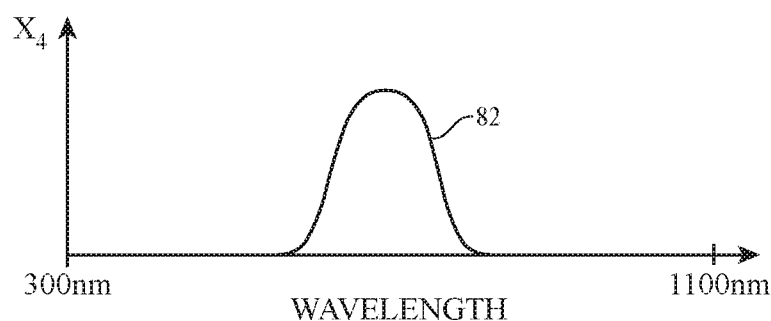

At step 66, a low pass filter such as a weak low pass filter (i.e., a filter that is weaker than the filter of step 62) may be applied to refined spectral response $x_3$, thereby producing final spectral response $x_4$. As shown in FIG. 8, the low pass filtering operations of step 66 may remove noise artifacts such as artifacts 86 of refined response $x_3$, thereby ensuring that final spectral response $x_4$ accurately represents the spectral response of the detector 22 that is being measured.

If additional detectors 22 in sensor 20 remain to be characterized, a new detector 22 may be selected at step 68 and the operations of steps 60, 62, 64, and 66 may be repeated for the new detector. Once all detectors 22 have been characterized and all associated spectral responses x have been produced, calibration data may be stored in device 10 by control circuitry 36.

Figure 9:
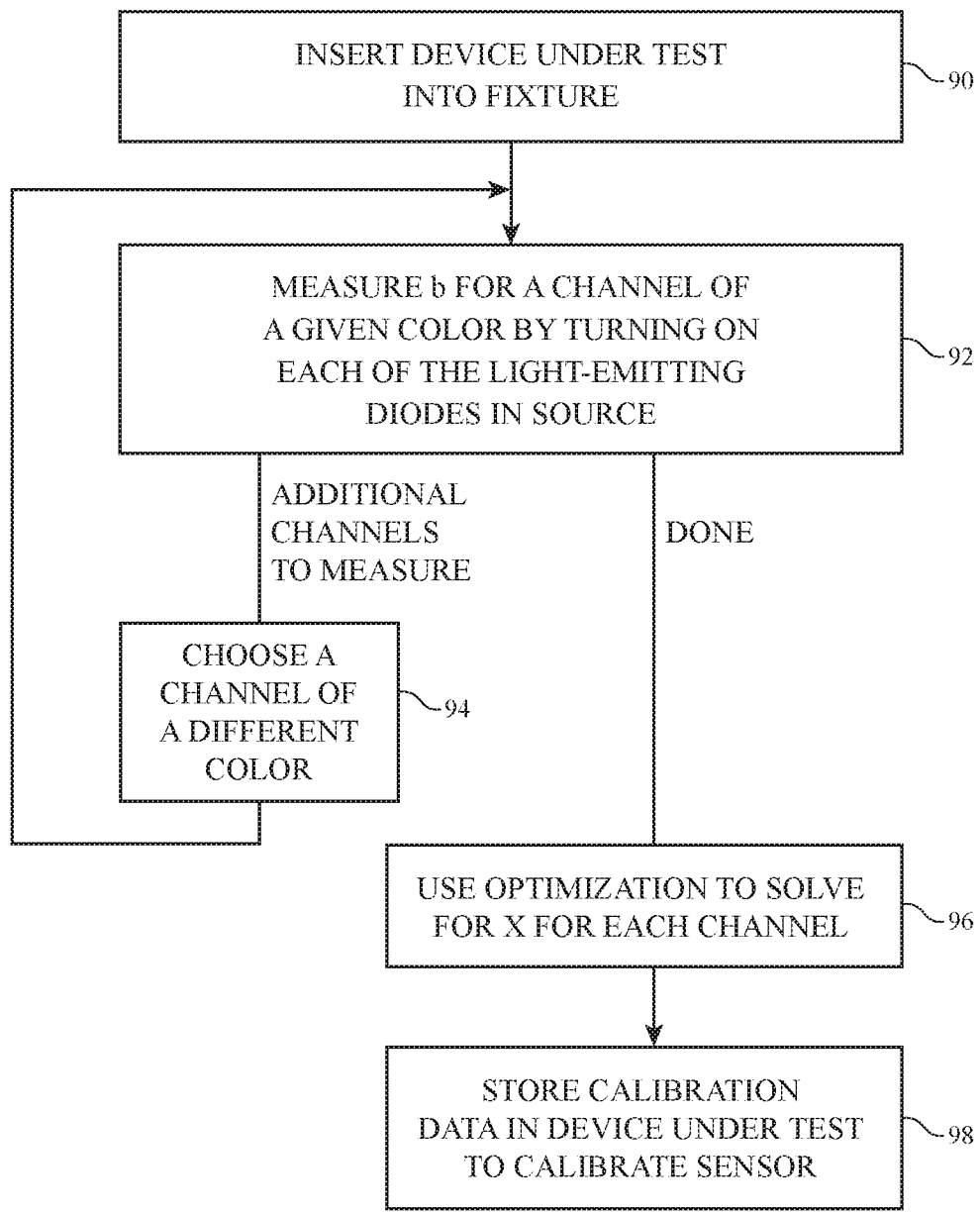
FIG. 9 is a flow chart of illustrative steps involved in calibrating an ambient light sensor in an electronic device in accordance with an embodiment.

A flow chart of steps involved in calibrating a device such as device under test 10 of FIG. 2 using calibration (test) system 30 of FIG. 2 is shown in FIG. 9.

At step 90, device 10 may be mounted into a fixture in system 32, so that test light 40 is directed towards detectors 22 of color sensing ambient light sensor 20.

At step 92, response b may be measured for one of the channels of sensor 20 (e.g., a particular one of detectors 22). Each of light-emitting diodes 34 of source 32 may be turned on in sequence to produce the entries of array b.

If additional channels remain to be measured, processing may proceed to step 94, where control circuitry 36 can select a new detector 22 to measure. After measured responses b have been gathered for all of detectors 22 in sensor 20, optimization techniques of the type described in connection with FIG. 4 may be used to solve for the spectral response x for each detector 22 (step 96).

Based on knowledge of the actual spectral response x of each of detectors 22, control circuitry 36 may, at step 98, store corresponding calibration data in control circuitry 16 of device 10 via path 38. Device 10 can use the known spectral responses x to calibrate raw data from detectors 22 during use of device 10 by a user, thereby ensuring that color sensing ambient light sensor 20 operates accurately.

In some situations, there may be noise in raw calibration measurements or other sources of potential error that make it difficult to recover the exact peak intensity of the sensor response (even though the wavelength dependence of the spectral response is accurate). If desired, additional calibration operations may be used to determine the peak value of the spectral response for each channel, thereby enhancing sensor calibration accuracy.

Figure 10:
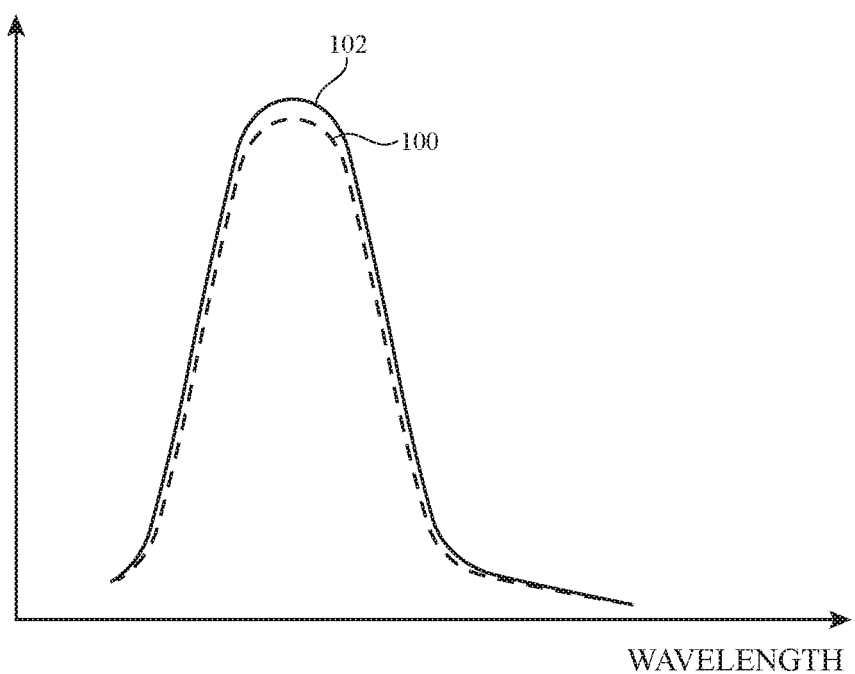
FIG. 10 is a graph showing how spectral responses for channels in an ambient light sensor may be corrected by application of a correction factor in accordance with an embodiment.

An illustrative calibrated sensor response is shown by dashed line 100 of FIG. 10. This sensor response may differ slightly from the true (corrected) sensor response represented by solid line 102. Using white light calibration techniques, a correction factor may be applied to the sensor response of line 100 to produce corrected sensor response 102. Sensor responses such as corrected response 102 may then be stored in device 10 to calibrate sensor 20.

Figure 11:
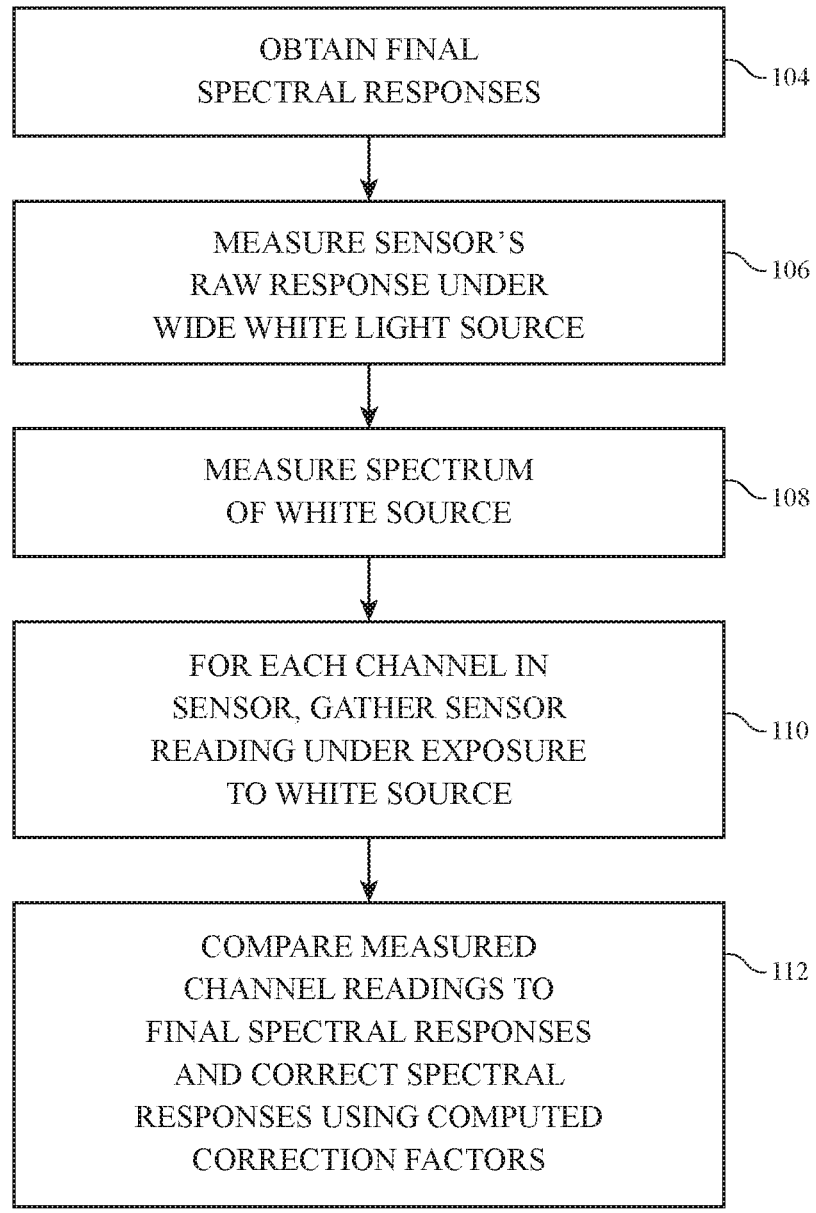
FIG. 11 is a flow chart of illustrative steps involved in using white light source measurements and processing operations to correct spectral responses for the channels in an ambient light sensor for variations in peak spectral response values in accordance with an embodiment.

Illustrative operations involved in using white light calibration operations to determine the peak channel sensitivity of each channel in sensor 20 are shown in FIG. 11.

At step 104, the operations of FIG. 4 may be used to identify the final spectral responses for the channels of sensor 20.

At step 106, the response of the detectors in sensor 20 may be measured while sensor 20 is being illuminated by a white light source (e.g., source 32 may include a white light source such as an incandescent light, a white light-emitting diode or array of white light-emitting diodes, etc.).

The spectrum of the white light source may be measured using a spectrometer at step 108.

At step 110, the sensor readings of each of the channels in the sensor may be measured while the sensor is exposed to white light from the white light source (producing measured channel readings MCR).

At step 112, an expected channel reading ECR for each channel may be computed (e.g., by producing a dot product of each channel's final spectral response with the white light source spectrum from step 108) and compared to the corresponding measured channel reading MCR. This comparison may produce correction factors that are applied to the final spectral responses to produce corresponding corrected versions of the final spectral responses. These corrected versions of the final spectral responses may then be stored in device 10 (see, e.g., FIG. 9).

With one illustrative arrangement, sensor 10 includes channels of different colors (e.g., a red channel, blue channel, and green channel) and a clear channel. A parameter "a" may be computed for each color by dividing the measured channel response (MCR) for that color by the clear channel response (e.g., for the red channel, "a"=MCR(red)/MCR (clear)). A parameter "b" may be computed for each color by dividing the expected channel reading for that color by the expected channel response for the clear channel (e.g., for the red channel, "b"=ECR(red)/ECR(clear)). Correction factors CF may then be produced for each colored channel by dividing b into a. For example, if a is 0.34 and b is 0.33 for the red channel, the red channel correction factor CF(red) will be 0.34/0.33. By multiplying the red spectral response curve (i.e., a curve such as curve 100 of FIG. 10) by CF(red), the corrected red spectral response curve (i.e., the spectral response curve with an accurately calibrated peak value) may be produced. After performing white-light peak calibration operations for all of the spectral responses (except the clear channel response) in this way, the device may be calibrated using the corrected spectral responses (see, e.g., step 98 of FIG. 9).

The foregoing is merely illustrative and various modifications can be made by those skilled in the art without departing from the scope and spirit of the described embodiments. The foregoing embodiments may be implemented individually or in any combination.

What is claimed is:

1. A method for calibrating an electronic device having a color sensing ambient light sensor with light detectors having different spectral responses using a test system having a tunable light source and control circuitry, comprising:
   with the tunable light source, supplying test light over a range of wavelengths;
   while exposed to the test light, gathering measured response data from each of the detectors with the control circuitry; and
   applying numerical optimization techniques implemented on the control circuitry to process the gathered measured response data to determine a spectral response for each of the detectors.

2. The method defined in claim 1 further comprising:
   using a white light source in producing versions of the spectral responses with corrected peak values.

3. The method defined in claim 1 wherein the tunable light source comprises light-emitting diodes and wherein supplying the test light comprises turning on each of the light-emitting diodes in sequence.

4. The method defined in claim 3 wherein the test light has wavelengths ranging from 300 nm to 1100 nm.

5. The method defined in claim 3 wherein applying the numerical optimization techniques comprises filtering estimated spectral responses to produce refined spectral responses and using the refined spectral responses as inputs in a numerical optimization process to produce final versions of the spectral responses for the detectors.

6. The method defined in claim 1 further comprising:
with the control circuitry, using the spectral responses of the detectors to produce corresponding calibration data; and
storing the calibration data in the electronic device.

7. The method defined in claim 6 wherein applying the numerical optimization techniques comprises making an initial estimate of each spectral response and using an iterative process to refine each initial estimate.

8. The method defined in claim 6 wherein applying the numerical optimization techniques comprises:
using a pseudo inverse technique to produce an estimated spectral response for each of the detectors; and
applying a low pass filter to each of the estimated spectral responses to produce refined spectral responses.

9. The method defined in claim 8 wherein applying the numerical optimization techniques comprises using the refined spectral responses as inputs in a numerical optimization process to produce final versions of the spectral responses for the detectors.

10. The method defined in claim 9 wherein the tunable light source comprises light-emitting diodes and wherein supplying the test light comprises adjusting the light-emitting diodes.

11. The method defined in claim 10 wherein the light-emitting diodes each have a spectrum that overlaps a spectrum of at least one of other of the light-emitting diodes.

12. The method defined in claim 11 wherein adjusting the light-emitting diodes comprises turning on each of the light-emitting diodes in sequence.

13. The method defined in claim 12 wherein the test system has 10 to 50 light-emitting diodes.

14. A method for calibrating an electronic device having a color sensing ambient light sensor with light detectors having different spectral responses using a test system having a tunable light source with light-emitting diodes and control circuitry, comprising:
with the light-emitting diodes of the tunable light source, supplying test light over a range of wavelengths;
while the detectors are exposed to the test light, gathering measured response data from each of the detectors with the control circuitry;
applying numerical optimization techniques implemented on the control circuitry to process the gathered measured response data to determine a spectral response for each of the detectors; and
based on the spectral responses of the detectors, storing corresponding calibration data in the electronic device.

15. The method defined in claim 14 wherein the tunable light source has fewer than 70 light-emitting diodes.

16. The method defined in claim 14 wherein applying the numerical optimization techniques comprises supplying refined spectral responses as inputs in a numerical optimization process to produce final versions of the spectral responses for the detectors.

17. The method defined in claim 16 wherein supplying the test light comprises turning on each of the light-emitting diodes in sequence.

18. The method defined in claim 17 wherein applying the numerical optimization techniques comprises:
using a pseudo inverse technique to produce an estimated spectral response for each of the detectors; and
filtering the estimated spectral responses to produce the refined spectral responses.

19. An electronic device, comprising:
a color sensing ambient light sensor with light detectors having different spectral responses;
control circuitry coupled to the color sensing ambient light sensor; and
a display that is adjusted by the control circuitry based on information from the color sensing ambient light sensor, wherein the control circuitry stores calibration data for the light detectors based on spectral responses for the detectors that have been loaded from a test system having a tunable light source with light-emitting diodes.

20. The electronic device defined in claim 19 wherein calibration data comprises calibration data produced by the test system by gathering measured responses for the light detectors while turning on each of the light-emitting diodes in sequence.

21. The electronic device defined in claim 20 wherein the calibration data comprises calibration data produced by the test system by applying pseudo inverse techniques and other numerical optimization techniques to the gathered measured responses to produce final versions of the spectral responses for the detectors.

* * * * *